(12) United States Patent
Shimosugi

(10) Patent No.: US 12,320,994 B2
(45) Date of Patent: Jun. 3, 2025

(54) SURFACE MATERIAL FOR PEN INPUT DEVICE AND PEN INPUT DEVICE

(71) Applicant: DAICEL CORPORATION, Osaka (JP)

(72) Inventor: Shota Shimosugi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 909 days.

(21) Appl. No.: 17/253,893

(22) PCT Filed: Jul. 2, 2019

(86) PCT No.: PCT/JP2019/026201
§ 371 (c)(1),
(2) Date: Dec. 18, 2020

(87) PCT Pub. No.: WO2020/009083
PCT Pub. Date: Jan. 9, 2020

(65) Prior Publication Data
US 2021/0271103 A1     Sep. 2, 2021

(30) Foreign Application Priority Data
Jul. 3, 2018  (JP) ................................ 2018-126568

(51) Int. Cl.
*G02B 5/02* (2006.01)

(52) U.S. Cl.
CPC ......... *G02B 5/0294* (2013.01); *G02B 5/0242* (2013.01)

(58) Field of Classification Search
CPC ......... G02B 5/02–5/0294; G06F 1/00–1/3296; G06F 3/00–3/167
See application file for complete search history.

(56) References Cited

U.S. PATENT DOCUMENTS

| 2005/0237307 A1 | 10/2005 | Hieda et al. |
| 2009/0059408 A1 | 3/2009 | Murata et al. |

(Continued)

FOREIGN PATENT DOCUMENTS

| JP | 2004-259256 A | 9/2004 |
| JP | 2007-164206 A | 6/2007 |

(Continued)

OTHER PUBLICATIONS

Machine translation of JP2016157386. Retrieved Nov. 4, 2023.*

(Continued)

*Primary Examiner* — Prashant J Khatri
(74) *Attorney, Agent, or Firm* — BIRCH, STEWART, KOLASCH & BIRCH, LLP

(57) ABSTRACT

A surface material for a pen input device includes a base element having a sheet shape, and a coating layer covering one surface of the base element, wherein the coating layer has a concavo-convex surface disposed on a side opposite to the base element side, recesses and protrusions having an absolute height of 1.0 μm or greater as measured with a scanning white-light interference microscope are formed on the concavo-convex surface, and a value of a surface roughness Sa of the surface material in a range where the absolute height of the concavo-convex surface is less than 1.0 μm as measured with the scanning white-light interference microscope is set to a value in a range of 0.10 or greater and 0.16 or less.

5 Claims, 4 Drawing Sheets

(56) References Cited

U.S. PATENT DOCUMENTS

| | | | | |
|---|---|---|---|---|
| 2015/0160745 A1* | 6/2015 | Hosaka | ................ | G06F 3/0393 428/141 |
| 2016/0326383 A1 | 11/2016 | Pokorny et al. | | |
| 2016/0328050 A1* | 11/2016 | Shimosugi | ............... | B05D 1/02 |
| 2018/0037755 A1 | 2/2018 | Shimosugi | | |
| 2018/0348898 A1 | 12/2018 | Kato et al. | | |
| 2018/0364822 A1* | 12/2018 | Taya | .................. | G06F 3/03545 |

FOREIGN PATENT DOCUMENTS

| | | | | | |
|---|---|---|---|---|---|
| JP | 2010-39170 | A | | 2/2010 | |
| JP | 2010-173234 | A | | 8/2010 | |
| JP | 2012-88693 | A | | 5/2012 | |
| JP | 2012-252038 | A | | 12/2012 | |
| JP | 2013-92782 | A | | 5/2013 | |
| JP | 2015-54417 | A | | 3/2015 | |
| JP | 2016-18333 | A | | 2/2016 | |
| JP | 2016-118788 | A | | 6/2016 | |
| JP | 2016157386 | A | * | 9/2016 | ............... B32B 3/26 |
| JP | 2017-40834 | A | | 2/2017 | |
| JP | 2017-508828 | A | | 3/2017 | |
| JP | 2018-5853 | A | | 1/2018 | |
| WO | WO 2016/158269 | A1 | | 10/2016 | |
| WO | WO 2016/158305 | A1 | | 10/2016 | |
| WO | WO-2017094784 | A1 | * | 6/2017 | ............... G06F 3/03 |
| WO | WO 2017/154095 | A1 | | 9/2017 | |

OTHER PUBLICATIONS

English translation of International Preliminary Report on Patentability for International Application No. PCT/JP2019/026201, dated Nov. 3, 2020.

Japanese Office Action for Japanese Application No. 2021-139254, dated Aug. 2, 2022 with English translation.

* cited by examiner

SURFACE MATERIAL FOR PEN INPUT DEVICE AND PEN INPUT DEVICE

TECHNICAL FIELD

The present invention relates to a surface material for a pen input device and a pen input device.

BACKGROUND ART

A pen input device that receives inputs from a stylus pen (a contactor) is equipped on a display surface thereof with, for example, a pen input device film to achieve writing feel like writing on paper with a pen.

The input surface of the pen input device film is required to have moderate resistance to the pen. Therefore, for example, as disclosed in Patent Document 1, a pen input device film has been developed in which recesses and protrusions are formed on an input surface by dispersing particles having a certain particle diameter in a base portion.

CITATION LIST

Patent Document

Patent Document 1: JP 2014-232277 A

SUMMARY OF INVENTION

Technical Problem

When a surface material for a pen input device such as the above-mentioned film is mounted on a surface of a display or the like having high precision pixels, emitted light from the display is refracted by the recesses and protrusions on the input surface of the film, or pixels of the display may appear to be enlarged due to a lens effect of the recesses and protrusions, whereby sparkle may be generated on the display, and the image may become difficult to see.

As a method of preventing the sparkle, for example, a method of minimizing the recesses and protrusions of the input surface to reduce the lens effect may be considered, but there is a risk that the writing feel on the surface material for a pen input device may become poor.

Therefore, an object of the present invention is to provide a surface material for a pen input device capable of preventing sparkle from occurring when mounted on a display and having excellent writing feel, and a pen input device capable of preventing sparkle and having excellent writing feel.

Solution to Problem

In order to solve the problems described above, a surface material for a pen input device according to an aspect of the present invention has a concavo-convex surface that receives inputs from a pen; and in the surface material, recesses and protrusions having an absolute height of 1.0 μm or greater as measured with a scanning white-light interference microscope are formed on the concavo-convex surface, and a value of a surface roughness Sa of the surface material in a range where the absolute height of the concavo-convex surface is less than 1.0 μm as measured with the microscope is set to a value in a range of 0.10 or greater and 0.16 or less.

With the above configuration, recesses and protrusions having an appropriate size may be formed on the concavo-convex surface by forming the recesses and protrusions having an absolute height of 1.0 μm or greater as measured with the scanning white-light interference microscope, on the concavo-convex surface. Therefore, vibration and acceleration of a pen when an input is performed on the concavo-convex surface with the pen are close to the vibration and acceleration of the pen when writing is performed on paper with the pen, and consequently, excellent writing feel that is close to the writing feel on paper can be obtained.

Further, since the value of the surface roughness Sa in the range where the absolute height of the concavo-convex surface is less than 1.0 μm as measured with the scanning white-light interference microscope, is set to the value in the range of 0.10 or greater and 0.16 or less, micro recesses and protrusions are formed on the concavo-convex surface, and thus, the lens effect of the recesses and protrusions of the concavo-convex surface is reduced. Accordingly, in a case where the surface material is mounted on the display, pixels are enlarged by the lens effect of the recesses and protrusions of the concavo-convex surface, and thus, sparkle is prevented from occurring on the display.

The surface material for a pen input device may include a base element having a sheet shape and a coating layer covering one surface of the base element, in which a surface of the coating layer disposed on a side opposite to the base element side may be the concavo-convex surface.

With the above configuration, a concavo-convex surface having a desired surface shape can be easily formed, for example by changing the coating layer while using a common base element. Further, the function of each of the base element and the coating layer can be easily exhibited.

The coating layer may have a base portion extending along the one surface of the base element; and first particles and second particles that are dispersed in the base portion, the first particles may have an average particle size set to a value in a range of 10 μm or greater and 15 μm or less, and the second particles may have an average particle size set to a value in a range of 0.4 μm or greater and less than 0.6 μm. Further, the first particles may be acrylic particles and the second particles may be silica particles. Further, the coating layer may have a haze value set to a value in a range of 8% or greater and 39% or less.

By performing these settings, the concavo-convex surface of the coating layer capable of preventing sparkle on the display can be easily formed while having excellent writing feel. Further, since the coating layer has the second particles, micro recesses and protrusions that are difficult to induce sparkle on the display can be imparted to the concavo-convex surface, reflection of external light on the concavo-convex surface can be favorably prevented, and anti-glare property can be imparted to the concavo-convex surface.

When the surface material is mounted on a surface of a display, the display may have a standard deviation of luminance distribution set to a value in a range of 0 or greater and 10 or less. Here, the value of the standard deviation of the luminance distribution of the display indicates a degree of variation of brightness on the display and is an objective indicator that can be used to quantitatively evaluate the sparkle on the display. Therefore, with the above configuration, the sparkle of the display via the surface material for the pen input device can be favorably prevented by setting the value of the standard deviation to a value in a range of 0 or greater and 10 or less.

The concavo-convex surface may have a maximum height of rolling circle waviness profile $W_{EM}$, as measured with a surface roughness shape measuring instrument, set to a value in a range of 8.0 or greater and 12.0 or less. By setting the maximum height of rolling circle waviness profile $W_{EM}$ of the concavo-convex surface in this manner, when an input is performed on the surface material for a pen input device with a pen, the amplitude and the acceleration of the pen when the pen vibrates as a result of touching and leaving the retention regions are close to the amplitude and the acceleration of the pen when writing is performed on paper with a pen, and consequently, the writing feel that is close to the writing feel on paper can be obtained. Thus, a surface material for a pen input device having further excellent writing feel can be obtained.

The surface material may have a transmission image clarity set to a value in a range of 45% or greater and 100% or less as measured with a 0.5 mm optical comb. Accordingly, it is possible to achieve a surface material for a pen input device capable of preventing sparkle on the display while having excellent writing feel, and favorably transmitting emitted light from the display.

A pen input device according to an aspect of the present invention includes a display; and an input surface that receives inputs from a pen at a position overlapping a display region of the display, in which the input surface has a coefficient of kinetic friction set to a value in a range of 0.24 or greater and 0.26 or less, and the display has a standard deviation of luminance distribution set to a value in a range of 0 or greater and 10 or less.

With the above configuration, in the pen input device, excellent writing feel can be obtained when the input surface receives inputs from a pen, and sparkle can be favorably prevented on the display.

Advantageous Effects of Invention

Each aspect of the present invention makes it possible to provide a surface material for a pen input device capable of preventing sparkle from occurring when mounted on a display and having excellent writing feel, and a pen input device capable of preventing sparkle and having excellent writing feel.

DESCRIPTION OF EMBODIMENTS

Embodiments of the present invention will be described below with reference to the drawings.

First Embodiment

[Surface Material for Pen Input Device]

Figure 1:
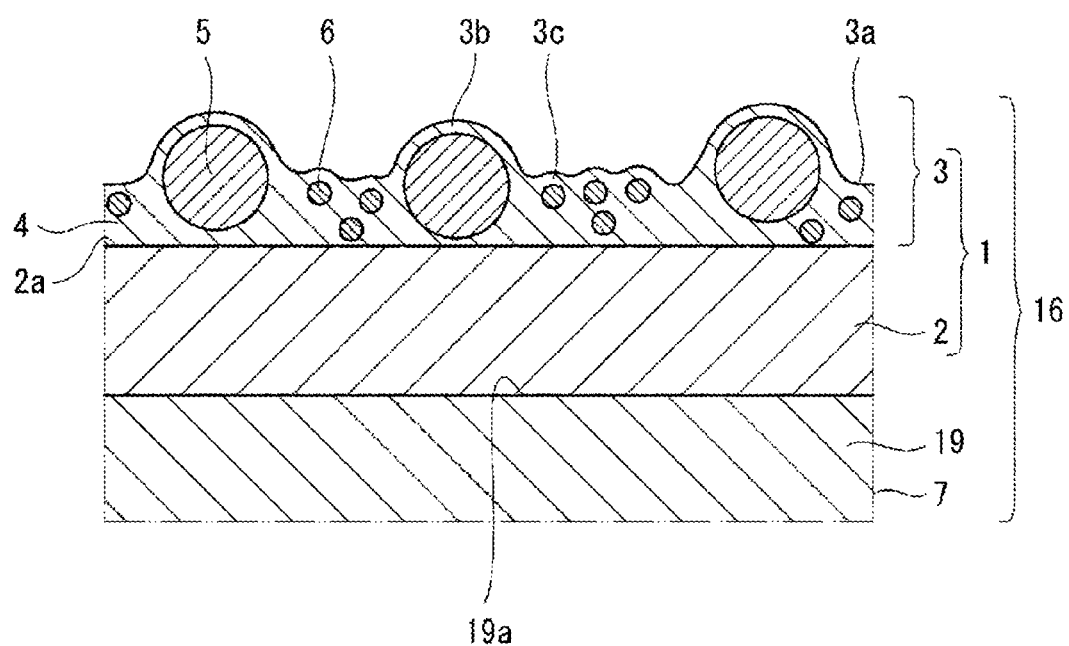
FIG. 1 is a schematic cross-sectional view of a pen input device according to a first embodiment.

FIG. 1 is a schematic cross-sectional view of a pen input device 16 according to a first embodiment. As illustrated in FIG. 1, the pen input device 16 includes a device unit 7 and a surface material 1 for a pen input device (hereinafter simply referred to as surface material 1). The device unit 7 has a display 19. As an example, the device unit 7 is, but not limited to, a smartphone.

The surface material 1 includes, as an example, a base element 2 having a sheet shape, and a coating layer 3 covering one surface of the base element 2. The surface material 1 is light-transmittable, and as an example, has a total light transmittance set to a value in a range of 88% or greater and 100% or less. The surface material 1 is a film here, but the thickness thereof is not limited. Therefore, the surface material 1 may be, for example, a plate element.

The base element 2 is a transparent element, with one surface being covered with the coating layer 3 and the other surface being mounted on a display surface 19a of the display 19 in the device unit 7. As an example, the material of the base element 2 is, but not limited to, polyethylene terephthalate (PET). The base element 2 is a film here, but the thickness thereof is not limited. Therefore, the base element 2 may be, for example, a plate element.

The coating layer 3 is a transparent layer and is disposed so as to cover one surface of the base element 2 (an upper surface 2a positioned on a side opposite to the display surface 19a). The coating layer 3 has a concavo-convex surface 3a disposed on a side opposite to the base element 2 side. The concavo-convex surface 3a is an input surface that receives inputs from a pen for a pen input device. The material of the tip portion of the pen can be set as appropriate, but is a polyacetal (POM) as an example. The thickness of the coating layer 3 is not limited.

In the surface material 1, recesses and protrusions having an absolute height of 1.0 μm or greater as measured with a scanning white-light interference microscope are formed on the concavo-convex surface 3a; and a value of a surface roughness Sa (arithmetic average roughness) of the surface material in a range where the absolute height of the concavo-convex surface 3a is less than 1.0 μm as measured with the above-mentioned microscope is set to a value in a range of 0.10 or greater and 0.16 or less.

Surface roughness Sa as used herein is defined as one obtained by extending the arithmetic average roughness Ra specified in JIS B0601 to three dimensions and dividing the volume of the portion surrounded by the surface shape curved surface and the average surface by the measurement area. In addition, using the scanning white-light interference microscope, the surface shape of the concavo-convex surface 3a can be confirmed in a non-contact manner, and the surface roughness Sa thereof can be measured.

In the surface material 1, the concavo-convex surface 3a has a maximum height of rolling circle waviness profile $W_{EM}$ as measured with a surface roughness shape measuring instrument, set to a value in a range of 8.0 or greater and 12.0 or less. Further, when the surface material 1 is mounted on a surface of the display 19, the display 19 has a standard deviation of luminance distribution set to a value in a range of 0 or greater and 10 or less. This measurement can be performed in accordance with JIS B0610, for example.

The coating layer 3 according to the present embodiment includes a base portion 4 extending along the upper surface 2a of the base element 2, and first particles 5 and second particles 6 that are dispersed in the base portion 4. As an example, the base portion 4 is made of a resin material. As an example, the first particles 5 are acrylic particles, and the second particles 6 are silica particles (nanosilica particles). The first particles 5 have an average particle size set to a value in a range of 10 μm or greater and 15 μm or less. The second particles 6 have an average particle size set to a value in a range of 0.4 μm or greater and less than 0.6 μm. In this example, the second particles 6 have an average particle size set to a value of 0.5 μm.

The average particle size as used herein refers to a 50% volume average particle size in the coulter counter method.

Further, the coating layer 3 has a haze value set to a value in a range of 8% or greater and 39% or less.

The particles 5, 6 are retained by the base portion 4 such that the particles are dispersed from each other within the base portion 4 and are covered with the base portion 4. The base portion 4 partially protrudes toward a side opposite to the base element 2 side at positions corresponding to the particles 5, 6 while covering the particles 5, 6.

Specifically, the base portion 4 has protruding portions 3b, 3c. At positions corresponding to the first particles 5, the protruding portion 3b protrudes toward the side opposite to the base element 2 from the peripheral region of the positions. At positions corresponding to the second particles 6, the protruding portion 3c protrudes toward the side opposite to the base element 2 from the peripheral region of the positions. The protruding portion 3b is larger than the protruding portion 3c.

In the surface material 1, a plurality of protruding portions 3b, 3c are arranged in a dispersed manner along the concavo-convex surface 3a of the coating layer 3. In other words, at least one protruding portion 3c is arranged between a pair of adjacent protruding portions 3b on the concavo-convex surface 3a of the coating layer 3.

In the pen input device 16, the surface (the concavo-convex surface 3a) of the surface material 1 on the opposite side to the display 19 side has a coefficient of kinetic friction set to a value in a range of 0.24 or greater and 0.26 or less. As described above, when the surface material 1 is mounted on the surface (display surface 19a) of the display 19, the display 19 has a standard deviation of luminance distribution set to a value in a range of 0 or greater and 10 or less.

As described above, the surface material 1 has the concavo-convex surface 3a that receives inputs from a pen. Then, the recesses and protrusions having an absolute height of 1.0 μm or greater as measured with a scanning white-light interference microscope are formed on the concavo-convex surface 3a, and the value of the surface roughness Sa in a range where the absolute height of the concavo-convex surface 3a is less than 1.0 μm as measured with the above-mentioned microscope is set to a value in a range of 0.10 or greater and 0.16 or less.

Accordingly, recesses and protrusions having an appropriate size are formed on the concavo-convex surface 3a by forming the recesses and protrusions having an absolute height of 1.0 μm or greater as measured with the above-mentioned microscope, on the concavo-convex surface 3a. Therefore, vibration and acceleration of a pen when an input is performed on the concavo-convex surface 3a with the pen are close to the vibration and acceleration of the pen when writing is performed on paper with the pen, and consequently, excellent writing feel that is close to the writing feel on paper can be obtained.

Further, in the surface material 1, since the value of the surface roughness Sa is set to the value in the range of 0.10 or greater and 0.16 or less in the range where the absolute height of the concavo-convex surface 3a is less than 1.0 μm as measured with the above-mentioned microscope, micro recesses and protrusions are formed on the concavo-convex surface 3a, and thus, the lens effect of the recesses and protrusions of the concavo-convex surface 3a is reduced. Accordingly, in a case where the surface material 1 is mounted on the display 19, sparkle resulting from pixels enlarged by the lens effect of the recesses and protrusions of the concavo-convex surface 3a is prevented from occurring on the display 19.

Here, according to studies conducted by the inventors, it has been found that sparkle of the display 19 is relatively significant in the case where the display 19 has a resolution of 200 ppi or greater. Therefore, by applying the surface material 1 to the device unit 7 including the display 19 having such high precision pixels, sparkle of the display 19 can be appropriately prevented.

The surface material 1 according to the present embodiment includes the base element 2 having a sheet shape and the coating layer 3 covering one surface of the base element 2, in which a surface of the coating layer 3 disposed on a side opposite to the base element 2 side is the concavo-convex surface 3a. Accordingly, the concavo-convex surface 3a having a desired surface shape can be easily formed, for example by changing the coating layer 3 while using a common base element 2. Further, the function of each of the base element 2 and the coating layer 3 can be easily exhibited.

The coating layer 3 according to the present embodiment has the base portion 4 extending along the upper surface 2a of the base element 2, and the first particles 5 and the second particles 6 that are dispersed in the base portion 4, and the first particles 5 have an average particle size set to a value in a range of 10 μm or greater and 15 μm or less, and the second particles 6 have an average particle size set to a value in a range of 0.4 μm or greater and less than 0.6 μm. Further, the first particles 5 are acrylic particles, and the second particles 6 are silica particles. Further, the coating layer 3 has a haze value set to a value in a range of 8% or greater and 39% or less.

By performing each of these settings, the concavo-convex surface 3a of the coating layer 3 capable of preventing sparkle on the display 19 can be easily formed while providing an excellent writing feel. Further, since the coating layer 3 has the second particles 6, micro recesses and protrusions that are difficult to induce sparkle on the display can be imparted to the concavo-convex surface 3a, external light reflection from the concavo-convex surface 3a can be favorably prevented, and anti-glare property can be imparted to the concavo-convex surface 3a.

Further, when the surface material 1 is mounted on the surface of the display 19, the display 19 has a standard deviation of luminance distribution set to a value in a range of 0 or greater to 10 or less. Here, the value of the standard deviation of the luminance distribution of the display 19 indicates a degree of variation of brightness on the display 19 and is an objective indicator that can be used to quantitatively evaluate the sparkle on the display 19. Therefore, the sparkle of the display 19 via the surface material 1 can be favorably prevented by setting the value of the standard deviation to a value in a range of 0 or greater and 10 or less.

In the surface material 1, a maximum height of rolling circle waviness profile $W_{EM}$ of the concavo-convex surface 3a as measured with a scanning white-light interference microscope is set to a value in a range of 8.0 or greater and 12.0 or less. By setting the maximum height of rolling circle waviness profile $W_{EM}$ of the concavo-convex surface 3a in this manner, when an input is performed on the surface material 1 with a pen, the amplitude and the acceleration of the pen when the pen vibrates as a result of touching and leaving the retention regions are close to the amplitude and the acceleration of the pen when writing is performed on paper with a pen, and consequently, a writing feel that is close to the writing feel on paper can be obtained. Thus, the surface material 1 having further excellent writing feel can be obtained.

The surface material 1 has a transmission image clarity set to a value in a range of 45% or greater and 100% or less as measured with a 0.5 mm optical comb. Accordingly, it is possible to achieve the surface material 1 capable of preventing sparkle on the display 19 while having excellent writing feel, and favorably transmitting emitted light from the display 19.

It should be noted that in a case where the average particle size of the first particles 5 is less than 10 μm, the writing feel on the concavo-convex surface 3a may become poor, and in the case where the value exceeds 15 μm, abrasion resistance may deteriorate. Further, it should be noted that in a case where the average particle size of the second particles 6 is less than 0.4 μm, there is a risk that the effect of preventing the sparkle on the display 19 and the effect of anti-glare property may decrease. It should also be noted that in a case where the average particle size of the second particles 6 is 0.6 μm or greater, there is a risk that sparkle on the display 19 may become significant.

It should be noted that in a case where the haze value of the coating layer 3 is less than 8%, the effect of anti-glare property of the display 19 may decrease. Further, it should be noted that in a case where the haze value of the coating layer 3 exceeds 39%, visibility of the display 19 may deteriorate (the occurrence of blurred characters or the like). It should also be noted that in a case where the surface material 1 has a transmission image clarity of less than 45% as measured with a 0.5 mm optical comb, there is a risk that the image display performance of the display 19 via the surface material 1 may deteriorate.

The first particles 5 have a relatively small impact on the sparkle of the display 19. Therefore, even if the coating layer 3 contains the first particles 5, the risk of increasing the sparkle on the display 19 due to the first particles 5 can be ignored.

The pen input device 16 is a pen input device including the display 19 and the input surface (the concavo-convex surface 3a) that receives inputs from a pen at a position overlapping a display region of the display 19, in which the input surface (the concavo-convex surface 3a) has a coefficient of kinetic friction set to a value in a range of 0.24 or greater and 0.26 or less, and the standard deviation of luminance distribution of the display 19 is set to a value in a range of 0 or greater and 10 or less. Therefore, in the pen input device 16, an excellent writing feel can be obtained when the input surface receives inputs from a pen, and sparkle can be favorably prevented on the display 19. A sparkle measurement apparatus and a sparkle evaluation method for inspecting and evaluating the surface material 1 will be described, in order, below.

Sparkle Measurement Apparatus

Figure 2:
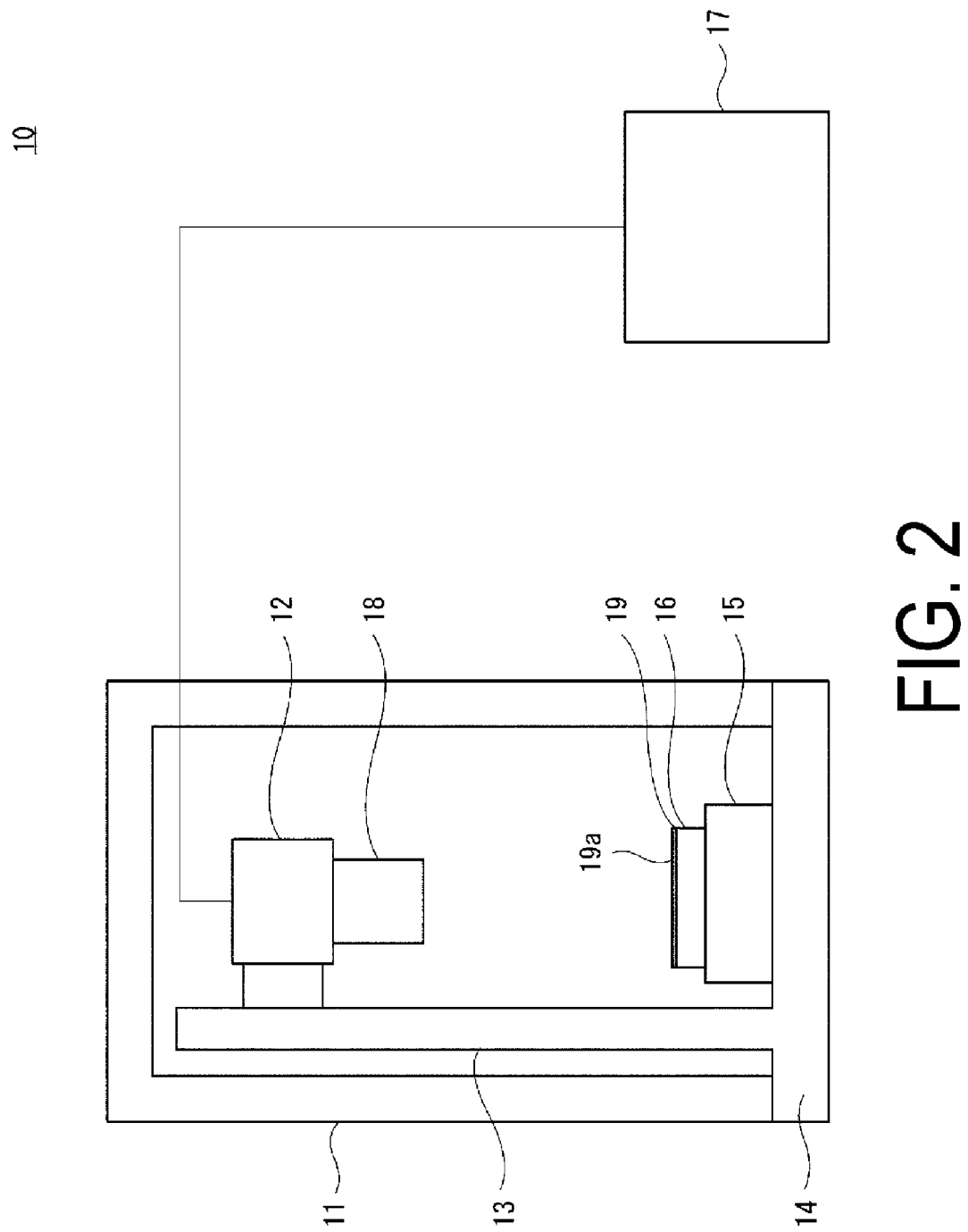
FIG. 2 is a schematic view of a sparkle measurement apparatus.

FIG. 2 is a schematic view of a sparkle measurement apparatus 10. The sparkle measurement apparatus 10 is an apparatus for evaluating the sparkle on the display 19 in the pen input device 16 having a surface material for a pen input device such as the surface material 1 mounted on the surface thereof. The sparkle measurement apparatus 10 includes an enclosure 11, an imaging device 12, a holding portion 13, an imaging device stand 14, a device stand 15, and an image processing device 17. An example of a commercially available sparkle measurement apparatus 10 is a Film Sparkle Measurement Apparatus available from Komatsu NTC Ltd.

The enclosure 11 has a dark room for capturing an image of the display 19 by the imaging device 12. The enclosure 11 accommodates the imaging device 12, the holding portion 13, the imaging device stand 14, the device stand 15, and the pen input device 16 as an evaluation target.

The imaging device 12 is, as an example, an area camera having a lens 18 and an imaging element, and captures an image to be displayed on the display 19. The imaging device 12 is connected to the image processing device 17, and is held by the holding portion 13 such that the lens 18 and the display 19 face each other. Image data captured by the imaging device 12 is transmitted to the image processing device 17.

The holding portion 13 extends in the vertical direction and holds the imaging device 12 while being fixed to the imaging device stand 14 at the lower end. The holding portion 13 holds the imaging device 12 such that a relative distance between the display 19 and the lens 18 can be changed by moving the imaging device 12 relative to the pen input device 16 in the vertical direction.

The pen input device 16 is placed on the upper surface of the device stand 15 under a state in which the display 19 with the surface material mounted thereon faces the imaging device 12. The device stand 15 supports the display 19 with the surface material mounted thereon, such that the surface of the display 19 faces the imaging device 12 and serves as a horizontal surface, and moves the pen input device 16 relative to the imaging device 12 in the vertical direction.

With the sparkle measurement apparatus 10, a pixel size of an image displayed on the display 19 is adjusted by adjusting a relative distance between the imaging device 12 and the display 19, with the image being captured per unit pixel (for example, one pixel) of the imaging element of the imaging device 12.

The image processing device 17 processes the image data captured by the imaging device 12. Specifically, the image processing device 17 determines a standard deviation of luminance of the display 19 from the image data captured by the imaging device 12.

The image processing device 17 is provided with: an input unit into which image data captured by the imaging device 12 is input, an image processing unit that performs image processing on the input image data, and an output unit that outputs to a display device, a printing device, or the like, a result processed by the image processing unit.

As the method for adjusting the pixel size of an image to be captured per unit pixel (for example, one pixel) of the imaging element when an image displayed on the display 19 is captured by the imaging device 12, in addition to the method of changing the relative distance between the imaging device 12 and the display 19, in a case where the lens 18 included in the imaging device 12 is a zoom lens, a method of changing a focal length of the imaging device 12 may be employed.

Evaluation Method of Sparkle

A method of evaluating sparkle of the display 19 using the sparkle measurement apparatus 10 is described below. In this evaluation method of sparkle, for convenience of evaluation, the display 19 in which a surface material for a pen input device such as the surface material 1 is mounted on a display surface 19a of the pen input device 16, is uniformly illuminated in a single color (green as an example) in advance and displayed.

Next, an adjusting step is performed to adjust the pixel size of the display 19 on which the surface material is mounted, the pixel size being a size to be imaged per unit pixel of the imaging element of the imaging device 12. In the adjusting step, the relative distance between the imaging device 12 and the display 19 on which the surface material is mounted is adjusted, according to the number of effective pixels of the imaging element of the imaging device 12, to an extent that, in the image captured by the imaging device 12, there is no emission line resulting from the pixels or there is no impact on the evaluation of the sparkle of the display 19 even if there is an emission line resulting from the pixels.

The relative distance between the imaging device 12 and the pen input device 16 is desirably set by taking into account usage conditions of the pen input device 16 (for example, the relative distance between user's eyes and the surface of the display 19).

After the adjustment step is performed, a setting step is performed in which a measurement area for evaluating the sparkle of the display 19, on which the surface material is mounted, is set. In the setting step, the measurement area is appropriately set according to, for example, the size of the display 19.

After the adjusting step has been performed, an imaging step is performed in which the measurement area of the display 19, on which the surface material is mounted, is imaged by the imaging device 12. At this time, as an example, at least one of exposure time of the imaging device 12 and luminance of all of the pixels of the display 19 is adjusted whereby image data as a gray scale image with an 8-bit gradation display and an average luminance of 170 gradations is obtained. The image data captured in the imaging is input into the image processing device 17. In the image processing device 17, the image data is subjected to image processing in a gray-scale image as an example.

After the imaging step, the image processing device 17 performs a calculation step to determine, by using image data, luminance variation in the measurement area of the display 19 on which the surface material is mounted. In this calculating step, the luminance variation is quantified as a standard deviation of the luminance distribution.

Here, the sparkle of the display 19, on which the surface material is mounted, increases as the luminance variation of the display 19, on which the surface material is mounted, becomes greater. Thus, as the value of the standard deviation of the luminance distribution becomes smaller, the sparkle of the display 19 can be quantitatively evaluated as being smaller.

In addition, in the adjusting step, the emission line of the display 19, on which the surface material is mounted, is adjusted to an extent that does not affect the evaluation of the sparkle of the display 19, and therefore luminance unevenness due to the emission line can be suppressed, and the sparkle of the display 19 can be accurately evaluated. By implementing each of the steps described above, the standard deviation (sparkle σ) of the luminance distribution of the display 19 when the surface material is mounted on the surface thereof, can be determined, and the sparkle of the display 19 can be evaluated from the value. Another embodiment will be described below focusing on differences from the first embodiment.

Second Embodiment

Figure 3:
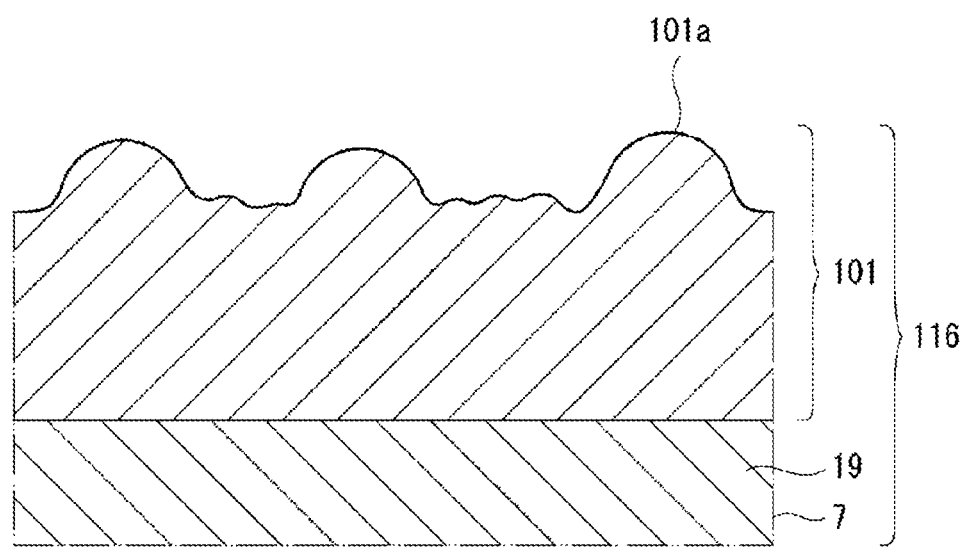
FIG. 3 is a schematic cross-sectional view of a pen input device according to a second embodiment.

FIG. 3 is a schematic cross-sectional view of a pen input device 116 according to a second embodiment. The pen input device 116 includes a surface material for a pen input device 101, having a single structure disposed overlapping the display 19. The surface material 101 has a concavo-convex surface 101*a*, which is an input surface that receives inputs from a pen. The concavo-convex surface 101*a* has the same surface shape as that of the concavo-convex surface 3*a*.

The surface material 101 is formed by, for example, transferring a concavo-convex shape to a surface of a sheet shaped uncured material (a resin material as an example) supported by a support member, using a molding member such as a molding roll, and then curing the material and peeling the material from the support member. Alternatively, the surface material 101 is formed by subjecting the surface of the sheet member to surface treatment such as sand blasting.

Figure 4:
FIG. 4 is a schematic cross-sectional view of a pen input device according to a third embodiment.

FIG. 4 is a schematic cross-sectional view of a pen input device 216 according to a third embodiment. A display 119 of a device unit 107 of the pen input device 216 has a concavo-convex surface 119*a*, which is an input surface that receives inputs from a pen. In the present embodiment, the outermost layer portion of the display 119 also serves as a surface material for a pen input device. The concavo-convex surface 119*a* has the same surface shape as that of the concavo-convex surface 3*a*. The outermost layer portion of the display 119 is composed of glass material as an example.

Confirmation Test

Test 1

The surface materials for a pen input device of Examples 1 to 5 and Comparative Examples 1 to 6 were fabricated with the compositions shown in Tables 1, 2 below. The "acrylic particles" in Tables 1, 2 correspond to the first particles 5. Also in Tables 1, 2, "CAP" is cellulose acetate propionate, and "surface roughness Sa" refers to a range where the absolute height of the concavo-convex surface is less than 1.0 µm.

The surface materials of Examples 1 to 5 correspond to the surface material 1 according to the first embodiment in which the coating layer 3 has the first particles 5 (acrylic particles) and the second particles 6 (nanosilica particles). The surface materials of Comparative Examples 1 and 2 correspond to a surface material in which the coating layer does not have particles other than the first particles 5. The surface materials of Comparative Examples 3 and 4 correspond to a surface material in which the coating layer does not have particles other than the first particles 5 and nanosilica particles having an average particle size of 0.6 µm. The surface materials of Comparative Examples 5 and 6 correspond to a surface material in which the coating layer does not have particles.

As "Ag solution 1" in Tables 1, 2, a solution containing nanosilica particles (average particle size: 0.6 µm), having a solid content concentration of 54.5%, and containing methoxypropanal (PGM), butyl acetate, and polyethyleneglycol methyl ether acetate (PGMEA) as solvents was used.

As "Ag solution 2" in Tables 1, 2, a solution containing nanosilica particles (average particle size: 0.5 µm), that is, the second particles 6, having a solid content concentration of 50.0%, and containing methoxypropanal (PGM), butyl acetate, and polyethyleneglycol methyl ether acetate (PGMEA) as solvents was used.

As "Haze adjusting solution" in Tables 1, 2, a solution having a solid content concentration of 59.5%, and containing methoxypropanal (PGM), butyl acetate, and polyethyleneglycol methyl ether acetate (PGMEA) as solvents was used.

The haze value and the total light transmittance of each of the surface materials were measured in accordance with JIS K7105 using a haze meter (NDH-5000 W, available from Nippon Denshoku Industries Co., Ltd.). The transmission clarity (transmission image clarity) of each of the surface materials was measured in accordance with JIS K7105 using an image clarity meter (ICM-1T, available from Suga Test Instruments, Co., Ltd.).

Further, using a "Film Sparkle Measurement Apparatus" available from Komatsu NTC Ltd. as the sparkle measurement apparatus 10, the sparkle σ when each of the surface materials was mounted on the display 19 was measured according to the above-mentioned evaluation method of sparkle. As the pen input device 16 provided with the display 19, a smartphone having a resolution of 441 ppi ("Galaxy S4", available from Samsung Electronics Co., Ltd.) was used. When the measurement was performed, at least one of the exposure time of the imaging device 12 and the luminance of all of the pixels of the display 19 was adjusted such that image data was obtained as a gray scale image with an 8-bit gradation display and an average luminance of 170 gradations.

Next, the coefficient of kinetic friction of each of the surface materials was measured using a static and dynamic friction measuring instrument "Handy Tribo-master TL201 Ts" available from Trinity-Lab. Inc. When the measurement was performed, a pen having a pen tip made of a polyacetal (pen tip diameter: 0.8 mm) was used, the angle of the pen with respect to the concavo-convex surface (input surface) of each of the surface materials was set to 45°, and the pen and the concavo-convex surface (input surface) were moved relative to each other at a moving speed of 50 mm/sec with a load of 200 g applied by the pen tip to the concavo-convex surface (input surface) of the coating layer of the surface material.

The maximum height of rolling circle waviness profile $W_{EM}$ of the concavo-convex surface (input surface) of each of the surface materials was measured in accordance with JIS B 610 using a surface roughness shape measuring instrument ("SURFCOM 1400G", available from Tokyo Seimitsu Co., Ltd.). The surface roughness Sa of the concavo-convex surface (input surface) in the range where the absolute height of the concavo-convex surface (input surface) of each of the surface materials was less than 1.0 μm, was measured using a scanning white-light interference microscope ("VertScan", available from Hitachi High-Tech Science Corporation).

Here, when the surface roughness Sa of the concavo-convex surface (input surface) of each of the surface materials was measured, the region of the concavo-convex surface having an absolute height of less than 1.0 μm was selected in the image of the concavo-convex surface (input surface) of the surface material captured by the scanning white-light interference microscope.

Further, as the sensory evaluation of each of the surface materials, the writing feel on a paper ("Copy paper standard type" available from Kaunet Co., Ltd.) with a pencil ("Uni HB", available from Mitsubishi Pencil Co., Ltd.) was used as a reference feel. In the case where a feel obtained when a tester inputted on the concavo-convex surface (input surface) of the coating layer in the surface material with a pen was close to the reference feel, the writing feel was evaluated as "OK", and in the case where the feel was far from the reference feel, the writing feel was evaluated as "NG". These measurement results and evaluation results are shown together in Tables 1, 2.

TABLE 1

| | | Example 1 | Example 2 | Example 3 | Example 4 | Example 5 |
|---|---|---|---|---|---|---|
| Composition of Coating Layer | Acrylate (wt %) | — | — | — | — | — |
| | Urethane acrylate (wt %) | — | — | — | — | — |
| | CAP (wt %) | — | — | — | — | — |
| | Acrylic particles (average particle size: 10 μm) (wt %) | — | — | — | — | — |
| | Acrylic particles (average particle size: 15 μm) (wt %) | 1 | 1 | 1 | 1 | 2 |
| | AG solution 1 (wt %) | | | | | |
| | AG solution 2 (wt %) | 80 | 60 | 50 | 30 | 80 |
| | Haze adjusting solution | 20 | 40 | 50 | 70 | 20 |
| Optical properties | Haze (%) | 38.1 | 19.2 | 18.0 | 8.0 | 19.2 |
| | Total light transmittance (%) | 90.6 | 90.4 | 90.9 | 90.2 | 90.4 |
| | Transmission clarity (%) | 49.3 | 54.1 | 55.3 | 72.2 | 54.1 |
| | Sparkle σ (standard deviation of luminance distribution) | 9.5 | 8.5 | 8.1 | 7.5 | 8.5 |
| Surface Shape | Surface roughness Sa (μm) | 0.1475 | 0.1484 | 0.1384 | 0.1019 | 0.1484 |
| Writing feel | Dynamic friction coefficient | 0.24 | 0.24 | 0.26 | 0.25 | 0.26 |
| | Maximum height of rolling circle waviness profile ($W_{EM}$) (μm) | 9.1 | 9.2 | 9.9 | 11.9 | 9.9 |
| | Sensory evaluation | OK | OK | OK | OK | OK |

TABLE 2

| | | Paper & pencil | Comparative Example 1 | Comparative Example 2 | Comparative Example 3 | Comparative Example 4 | Comparative Example 5 | Comparative Example 6 |
|---|---|---|---|---|---|---|---|---|
| Composition of Coating Layer | Acrylate (wt %) | — | 80 | 80 | — | — | 80 | 89 |
| | Urethane acrylate (wt %) | — | 20 | 20 | — | — | 20 | — |
| | CAP (wt %) | — | 7 | 7 | — | — | 7 | 11 |
| | Acrylic particles (average particle size: 10 μm) (wt %) | — | 4 | 2 | — | 1 | — | — |
| | Acrylic particles (average particle size: 15 μm) (wt %) | — | 2 | 1 | 1 | — | — | — |

TABLE 2-continued

|  |  | Paper & pencil | Comparative Example 1 | Comparative Example 2 | Comparative Example 3 | Comparative Example 4 | Comparative Example 5 | Comparative Example 6 |
|---|---|---|---|---|---|---|---|---|
|  | AG solution 1 (wt %) | — | — | — | 78 | 78 | — | — |
|  | AG solution 2 (wt %) | — | — | — | — | — | — | — |
|  | Haze adjusting solution (wt %) | — | — | — | 22 | 22 | — | — |
| Optical properties | Haze (%) | — | 27.8 | 20.8 | 14.1 | 24.8 | 0.6 | 17.0 |
|  | Total light transmittance (%) | — | 91.6 | 91.1 | 90.7 | 90.6 | 90.7 | 91.0 |
|  | Transmission clarity (%) | — | 1.5 | 5.8 | 40.1 | 28.1 | 90.3 | 83.0 |
|  | Sparkle σ (standard deviation of luminance distribution) | — | 13.4 | 13.8 | 12.1 | 12.7 | 4.2 | 7.2 |
| Surface Shape | Surface roughness Sa (μm) | — | 0.2319 | 0.2108 | 0.1673 | 0.1893 | 0.0011 | 0.0928 |
| Writing feel | Dynamic friction coefficient | 0.25 | 0.25 | 0.22 | 0.24 | 0.25 | 0.08 | 0.10 |
|  | Maximum height of rolling circle waviness profile ($W_{EM}$) (μm) | — | 10.3 | 9.2 | 9.3 | 10.5 | 3.1 | 3.9 |
|  | Sensory evaluation | OK | OK | OK | OK | OK | NG | NG |

As shown in Tables 1, 2, it has been found that the surface materials of Examples 1 to 5 have the same sensory evaluation as those of Comparative Examples 1 to 4, and have the same excellent writing feel as those of Comparative Examples 1 to 4. The reason for this is considered that the coating layers of Examples 1 to 5 have acrylic particles (first particles 5) in the same manner as the coating layers of Comparative Examples 1 to 4.

In other words, it has been considered that, in Examples 1 to 5, with the acrylic particles described above, recesses and protrusions having an absolute height of 1.0 μm or greater as measured with a scanning white-light interference microscope are formed on the concavo-convex surface 3a, as a result, the value of the maximum height of rolling circle waviness profile $W_{EM}$ is set to a value substantially equal to those in Comparative Examples 1 to 4, and consequently, the feel obtained when input is performed on the concavo-convex surface 3a with a pen is substantially the same as those in Comparative Examples 1 to 4.

Also, it has been found that the sparkle σ values are reduced in Examples 1 to 5 as compared to those in Comparative Examples 1 to 4, and as a result, the sparkle of the display 19 can be prevented. The reason for this is considered as follows: in Examples 1 to 5, the coating layer 3 contains the second particles 6, and the surface roughness Sa in the range where the absolute height of the concavo-convex surface 3a is less than 1.0 μm is suppressed as compared to the surface roughness Sa in Comparative Examples 1 to 4, thereby reducing the lens effect of the concavo-convex surface 3a that enlarges the pixels of the display 19. Further, it has been found that the surface materials of Examples 1 to 5 have the same total light transmittance as those of Comparative Examples 1 to 6, and thus, the image of the display 19 can be favorably transmitted.

The surface materials of Comparative Examples 1, 2 are equivalent to a known surface material for a pen input device, and it has been found that, although the writing feel of the input surface is excellent because of the coating layer having the first particles 5, there is a risk that sparkle may occur on the display 19 due to the coating layer having no second particles 6. Further, the coating layers of Comparative Examples 3, 4 have nanosilica particles having an average particle size of 0.6 μm in addition to the first particles 5, but it has been found that even these nanosilica particles do not sufficiently prevent sparkle on the display 19.

Further, it has found that in Comparative Examples 5, 6, the sparkle σ values are significantly smaller, but the value of the maximum height of rolling circle waviness profile $W_{EM}$ are significantly smaller and the sensory evaluations are poorer than in Examples 1 to 5 and Comparative Examples 1 to 4. The reason for this is considered that, since the coating layers of Comparative Examples 5, 6 do not contain any particles, sparkle of the display 19 can be prevented, but the recesses and protrusions on the input surface to be in contact with the pen are greatly suppressed, and thus, the writing feel is deteriorated.

From the test results described above, it has been confirmed that according to Examples 1 to 5, the concavo-convex surface 3a of the coating layer 3 capable of suppressing the sparkle of the display 19 can be formed while having excellent writing feel.

From the test results and the other results of studies performed by the inventors, it has been found that recesses and protrusions having an absolute height of 1.0 μm or greater as measured with a scanning white-light interference microscope are formed on the concavo-convex surface 3a, and the value of the surface roughness Sa in a range where the absolute height of the concavo-convex surface 3a is less than 1.0 μm as measured with the above-mentioned microscope needs to be set to a value in a range of 0.10 or greater and 0.16 or less.

It has also found that, in order to obtain good image display performance of the display 19 via the surface material 1, the transmission image clarity is desirably set to a value in a range of 45% or greater to 100% or less as measured with a 0.5 mm optical comb.

In order to obtain an appropriate writing feel and to prevent the reflection of external light to the concavo-convex surface 3a, it has been found that the haze value of the coating layer 3 is desirably set to a value in a range of 8% or greater and 39% or less. It has also found that, in order to obtain further excellent writing feel, the maximum height of rolling circle waviness profile $W_{EM}$ of the concavo-convex surface 3a as measured with the above-mentioned microscope is set to a value in a range of 8.0 or greater and 12.0 or less.

Test 2

The pen input device 16 of the first embodiment was produced as an example device. As the device unit 7, a smartphone having a resolution of 441 ppi ("Galaxy S4", available from Samsung Electronics Co., Ltd.) was used, and as the surface material 1, the surface material 1 of Example 1 was used.

To produce this example device, the surface material 1 was constituted as an adhesive film by attaching an adhesive surface (on an OCA layer side) of an adhesive film "PX38T02G50/PDSIT" (constitution: Trilayer structure of OCA layer (optically transparent adhesive layer: thickness: 25 μm)/PET layer (thickness: 38 μm)/silicon adhesive layer (thickness: 50 μm)) available from PANAC Co., Ltd., to the base element 2 in the surface material 1 of Example 1. The surface material 1 was adhered to the surface of the display 19 on the other adhesive surface (on the silicon adhesive layer side). Thus, the surface material 1 was mounted on the device unit 7.

Next, an average coefficient of kinetic friction of the concavo-convex surface 3a was measured using a static and dynamic friction measuring instrument "Handy Tribo-master TL201 Ts" available from Trinity-Lab. Inc. When the measurement was performed, a pen having a pen tip made of a polyacetal (pen tip diameter: 0.8 mm) was used, the angle of the pen with respect to the concavo-convex surface 3a was set to 45°, and the pen and the concavo-convex surface 3a were moved relative to each other 3 times for a moving distance of 50 mm at a moving speed of 50 mm/sec with a load of 50 g applied by the pen tip to the concavo-convex surface 3a of the coating layer of the surface material.

The average kinetic coefficient of friction of the example device obtained from this measurement result was the same value as the measurement value of the kinetic coefficient of friction in Example 1. Further, when the sensory evaluation for the writing feel of the example device was performed in the same manner as in Test 1, the evaluation resulted in almost the same as those in Examples 1 to 5, which were excellent.

The present invention is not limited to the embodiments, and the configuration of the present invention can be modified, added, or deleted, without departing from the spirit of the present invention.

REFERENCE SIGNS LIST 1, 101 Surface material for pen input device
2 Base element
5 3 Coating layer
3a, 101a, 119a Concavo-convex surface
4 Base portion
5 First particle
6 Second particle
10 16, 116, 216 Pen input device
19, 119 Display

The invention claimed is:

1. A surface material for a pen input device, comprising:
a concavo-convex surface that receives inputs from a pen;
a base element having a sheet shape; and
a coating layer covering one surface of the base element,
wherein the coating layer includes a base portion extending along the one surface of the base element and first particles and second particles that are dispersed in the base portion, the first particles having an average particle size set to a value in a range of 10 μm or greater and 15 μm or less, and the second particles having an average particle size set to a value in a range of 0.4 μm or greater and less than 0.6 μm,
wherein a surface of the coating layer disposed on a side opposite to the base element side is the concavo-convex surface,
wherein recesses and protrusions having an absolute height of 1.0 μm or greater as measured with a scanning white-light interference microscope are formed on the concavo-convex surface, and a value of a surface roughness Sa of the surface material in a range where the absolute height of the concavo-convex surface is less than 1.0 μm as measured with the microscope is set to a value in a range of 0.10 μm or greater and 0.16 μm or less, and
wherein the first particles are acrylic particles and the second particles are silica particles.

2. The surface material for a pen input device according to claim 1, wherein the coating layer has a haze value set to a value in a range of 8% or greater and 39% or less.

3. The surface material for a pen input device according to claim 1, wherein when the surface material is mounted on a surface of a display, the display has a standard deviation of luminance distribution set to a value in a range of 0 or greater and 10 or less.

4. The surface material for a pen input device according to claim 1, wherein the concavo-convex surface has a maximum height of rolling circle waviness profile $W_{EM}$ as measured with a surface roughness shape measuring instrument, set to a value in a range of 8.0 or greater and 12.0 or less.

5. The surface material for a pen input device according to claim 1, having a transmission image clarity set to a value in a range of 45% or greater and 100% or less as measured with a 0.5 mm optical comb.

* * * * *